J. G. PERRIN.
AUTOMOBILE SIDE LAMP.
APPLICATION FILED MAY 10, 1912.
1,096,452.
Patented May 12, 1914.
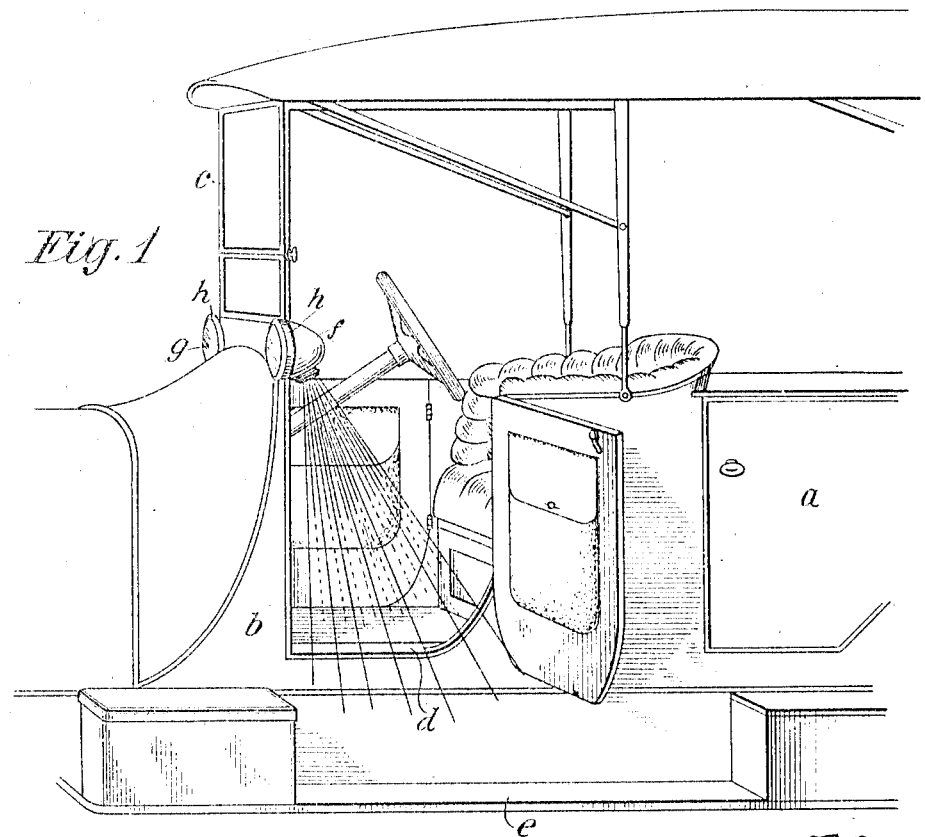
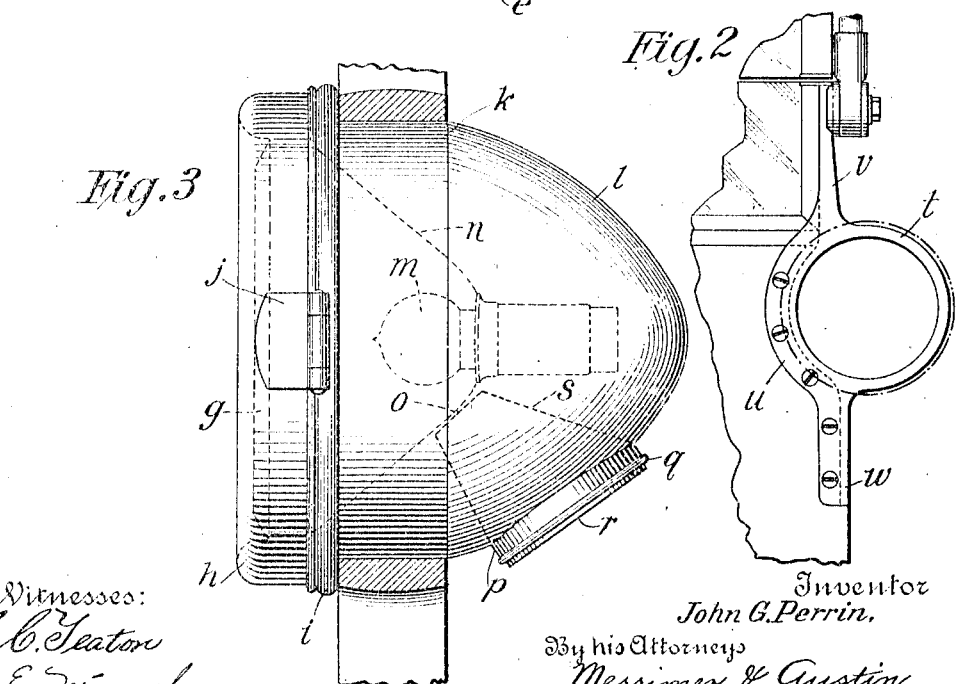
Witnesses:
S. C. Teator
F. E. Manuel
Inventor
John G. Perrin,
By his Attorneys
Messimer & Austin

UNITED STATES PATENT OFFICE.

JOHN G. PERRIN, OF DETROIT, MICHIGAN.

AUTOMOBILE SIDE LAMP.

1,096,452.  Specification of Letters Patent.  Patented May 12, 1914.

Application filed May 10, 1912.  Serial No. 696,326.

*To all whom it may concern:*

Be it known that I, JOHN G. PERRIN, a citizen of the United States, residing at Detroit, in the county of Wayne and State of Michigan, have invented new and useful Improvements in Automobile Side Lamps, of which the following is a specification.

My invention relates to automobile side lamps, and has for its object the devising of a lamp and a retaining bracket therefor, the lamp being constructed with an auxiliary opening of suitable angular direction to permit sufficient rays from the light to be emitted therethrough to illuminate the threshold and running board of the automobile, and the bracket being suitably constructed for easy attachment to the automobile, as for instance from the dash board thereof, to engage the lamp, in adjustable relation thereto, to bring the auxiliary opening at the proper position relative to the threshold and running board.

A further object of my invention is to arrange the auxiliary opening or window relative the main window, so that the rays emitted through the former rearwardly will not detract materially from the strength of the light intended to be thrown forward through the latter.

Referring to the drawings forming a part of this specification:—Figure 1 is a perspective view of a portion of an automobile with my improved side lamps attached. Fig. 2 is a fragmental front view of Fig. 1, showing the bracket for the lamp and the manner of attachment. Fig. 3 is a side view of the lamp and a central sectional view of the engaging bracket.

The automobile $a$ is intended to represent any convenient type having the dash board $b$, wind shield $c$, threshold $d$ and running board $e$.

The lamp $f$ shows a preferred type especially well adapted for the embodiment of my improvements. The lamp is of the so called bullet type having a glass window $g$ forming substantially the entire front, incased in a rim $h$. This may be as shown, conveniently secured to a beading $i$ as by fasteners $j$. The exterior of the lamp immediately to the rear of the beading is preferably of smaller diameter and cylindrical to form a band $k$ for suitable engagement with the bracket. The rear end $l$ of the lamp is formed rounding or bullet shaped. An incandescent lamp $m$ of the usual type is suitably positioned within the reflector $n$. In order to obtain the desired rearwardly directed rays, the reflector $n$ is formed with an opening $o$, which is suitably situated rearwardly of the bulb to receive rays therefrom that will not materially decrease the strength of the light through the main or front window. An opening $p$ is formed in the outer wall of the lamp communicating with the opening $o$ and positioned in relation thereto and to the threshold and running board of the automobile, so that the rays coming from the lamp will be directed squarely upon these parts of the automobile. A rim $q$ is formed about the opening having a glass window $r$ secured therein through which the light passes. The interior of the auxiliary opening is preferably inclosed by a reflecting wall $s$.

The bracket for engaging the lamp comprises the ring $t$ having a cylindrical inner wall to snugly engage the lamp about the band $k$, the beading $i$ forming a stop for the lamp. The frictional engagements between the band and ring may be relied upon to retain the lamp in place or a set screw (not shown) or other attaching means may be used if desired. A flange $u$ is formed about a suitable portion of one side of the ring which connects at its ends with ears $v$—$w$ extending respectively from the upper and lower parts of the ring.

To attach the brackets to the sides of the dash board and wind shield, as shown in Figs. 1 and 2, it is necessary to cut away a portion thereof to bring the ears into proper positions as shown. The flange and ears are provided with screw holds for securing the bracket in position. This particular construction enables the bracket to be very strongly secured into position to resist the hard usage that such projecting members are subject to.

It will be observed that my manner of securing the lamp enables it to be easily rotated within the bracket to bring the auxiliary window in the most advantageous position for casting the light therefrom upon the threshold and running board of the car, thus making it perfectly safe to enter and alight therefrom, which adjustment does not affect the proper positioning of the front window.

Having thus described my invention I claim:

1. An automobile side lamp comprising an illuminating source, a window in front of said source for emitting light frontwardly, a window to the rear and below said source for emitting light rearwardly and downwardly, and means for securing the lamp in adjustable position to change the direction of the rearwardly directed light while maintaining the direction of the frontwardly directed light uniform.

2. An automobile side lamp comprising an illuminating source, a window in front of said source for emitting light frontwardly, a window to the rear and below said source for emitting light rearwardly and downwardly, a ring for supporting the lamp in adjustable position for changing the direction of the rearwardly emitted light while maintaining the frontwardly directed light uniform, and means for securing the ring to the automobile in an unobstructed position.

3. An automobile side lamp comprising an outer rim, having a circular opening, a lamp revolubly engaged within said opening, an illuminating source, a window in front of said illuminating source, said illuminating source and window being centrally located relative said rim and a window to the rear of said illuminating source out of center with the ring for emitting rays rearwardly and downwardly.

4. The combination with a vehicle body, a dash, a door in the rear of the dash and adjacent thereto, a step below the door, and a lamp support secured to the dash, and projecting laterally beyond the side of the vehicle body, of a lamp secured in said support comprising a chamber having walls diverging from the interior forwardly to project light in front of the dash, a chamber having walls diverging from the interior downwardly and rearwardly to project light onto said door and step in the rear of the dash, and a source of light at the converging ends of said chambers.

5. The combination with a vehicle body, a dash, a door in the rear of the dash and adjacent thereto, a step below the door and a lamp support secured to the dash and projecting laterally beyond the side of the vehicle body, of a lamp secured in said support, and provided with a light emitting port at the rear of the dash adapted to emit light downwardly and rearwardly to illuminate said door and step and a separate light emitting port at the front of the dash adapted to project light in advance of said vehicle.

6. In an automobile, the combination with the parts forming the seating space thereof, and an entrance thereto including a threshold, of means for throwing a beam of light forward of the seating space and upon said threshold while shading said seating space, comprising a lamp having a source of light therein, and a reflector between said source of light and said seating space for directing the light forward and shading said seating space, said reflector having an auxiliary opening in line with a relatively larger opening facing the threshold whereby the threshold is directly illuminated from said source of light.

7. In an automobile, the combination with the parts forming the seating space thereof, and an entrance thereto including a threshold, of means for throwing a beam of light forward of the seating space and upon said threshold while shading said seating space comprising a lamp having a source of light therein and a reflector between said source of light and said seating space for directing the light forward and shading said seating space, said reflector having an extension forming an auxiliary passage in line with said source of light and said threshold whereby said threshold is directly illuminated from its source, said passage having a relatively small inner opening close to the source of light and a relatively larger outer opening facing the threshold.

This specification signed and witnessed this 18 day of April, A. D., 1912.

JOHN G. PERRIN.

Signed in the presence of—
OAKLEY E. DISTIN,
JOHN TURCOTT.